US012548911B2

(12) United States Patent
Cheng

(10) Patent No.: US 12,548,911 B2
(45) Date of Patent: Feb. 10, 2026

(54) ANTENNA STRUCTURE AND ELECTRONIC DEVICE

(71) Applicant: CyberTAN Technology Inc., Hsinchu (TW)

(72) Inventor: Shih-Hung Cheng, Hsinchu (TW)

(73) Assignee: CyberTAN Technology Inc., Hsinchu (TW)

( * ) Notice: Subject to any disclaimer, the term of this patent is extended or adjusted under 35 U.S.C. 154(b) by 43 days.

(21) Appl. No.: 18/744,757

(22) Filed: Jun. 17, 2024

(65) Prior Publication Data

US 2025/0385431 A1 Dec. 18, 2025

(51) Int. Cl.
*H01Q 9/22* (2006.01)
*H01Q 5/50* (2015.01)

(52) U.S. Cl.
CPC ................. *H01Q 9/22* (2013.01); *H01Q 5/50* (2015.01)

(58) Field of Classification Search
CPC ................................... H01Q 9/22; H01Q 5/50
See application file for complete search history.

(56) References Cited

U.S. PATENT DOCUMENTS 2,158,271 A * 5/1939 Buschbeck .............. H01Q 9/14 343/831
2,234,293 A * 3/1941 Usselman .............. H01Q 21/12 343/832
2,781,514 A * 2/1957 Nail .......................... H01Q 9/14 343/823
3,453,618 A * 7/1969 Kline ........................ H01Q 9/30 343/745
4,385,279 A * 5/1983 Meador ..................... H03H 5/02 333/202
4,459,597 A * 7/1984 Blaese ...................... H01Q 9/32 343/900
4,460,896 A * 7/1984 Shmitka .................... H01Q 5/40 343/750
5,349,362 A * 9/1994 Forbes ...................... H01Q 1/42 343/873

(Continued)

FOREIGN PATENT DOCUMENTS

CN 110011023 A * 7/2019 ............... H01Q 1/42
CN 218632450 3/2023

(Continued)

*Primary Examiner* — Dameon E Levi
*Assistant Examiner* — Jordan E. DeWitt
(74) *Attorney, Agent, or Firm* — ScienBiziP, P.C.

(57) ABSTRACT

A antenna structure is arranged on a circuit board, a first surface of the circuit board includes an RF circuit, and the antenna structure includes: a metal screw, fixed on the first surface through a metal hole; the metal hole forms a metal ring; a plastic column, set above the metal screw; a metal tube, embedded with the plastic column, wherein there is a first predetermined distance between the metal tube and the metal screw; a metal shrapnel, extending from a bottom of the metal tube, wherein the metal screw is electrically connected to the RF circuit or the metal tube is electrically connected to the RF circuit to enable the metal screw and the metal tube to transmit or receive signals. The present disclosure also provides an electronic device, and the metal screw also uses to fix the circuit board to the housing of the electronic device.

17 Claims, 5 Drawing Sheets

(56) References Cited

U.S. PATENT DOCUMENTS 5,621,420 A * 4/1997 Benson .................... H01Q 9/30 343/790
5,859,617 A * 1/1999 Fujikawa ............... H01Q 11/08 343/900
5,982,332 A * 11/1999 Lewis, Jr. ................ H01Q 9/16 343/750
6,002,372 A * 12/1999 Sullivan ................. H01Q 1/244 343/702
6,201,500 B1 * 3/2001 Fujikawa ................. H01Q 9/14 343/702
6,215,446 B1 * 4/2001 Sullivan ................. H01Q 1/088 343/702
7,170,459 B1 * 1/2007 McKim .................... H01Q 1/34 343/709
11,600,921 B1 * 3/2023 Chen ...................... H01Q 5/357
2004/0246186 A1 * 12/2004 Shimabara ............. H01Q 5/371 343/702
2005/0057430 A1 * 3/2005 Noguchi ................ H01Q 5/321 343/702
2006/0022883 A1 * 2/2006 Vincent .................... H01Q 1/36 343/722
2012/0043427 A1 * 2/2012 Flemin ..................... B64G 1/58 244/171.7
2013/0271327 A1 * 10/2013 Oohara .................... H01Q 1/24 343/702
2018/0062241 A1 * 3/2018 Lester ...................... H01Q 1/44
2019/0386383 A1 * 12/2019 Shehan .................... H01Q 1/52
2021/0288407 A1 * 9/2021 Contal ..................... H01Q 1/44
2024/0313390 A1 * 9/2024 Xiong ...................... H01Q 1/50

FOREIGN PATENT DOCUMENTS

CN 106785356 B * 2/2024 ............. H01Q 1/288
GB 2348055 A * 9/2000 ........... H01R 12/714
TW 554568 B 9/2003
TW 200933973 A 8/2009

* cited by examiner

ANTENNA STRUCTURE AND ELECTRONIC DEVICE

FIELD

The present disclosure generally relates to a technical field of antenna, and more particularly to an antenna structure and electronic device.

BACKGROUND

As a necessary component of communication device, antennas are mainly used to receive and transmit signals, and transmit the signals to the chip for processing, so as to form voice, image, text and other information that we can recognize. Some thin communication electronic devices, such as mobile phones, laptops etc. Their design are becoming more and more refined, and the internal space of the some lightweight communication electronic devices getting smaller and smaller. However, most of the commonly used dipole antennas need to be fed through a coaxial cable and connected to the radio frequency circuit through the coaxial cable, which requiring additional space placement, and cannot meet the miniaturization requirement of communication electronic devices.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
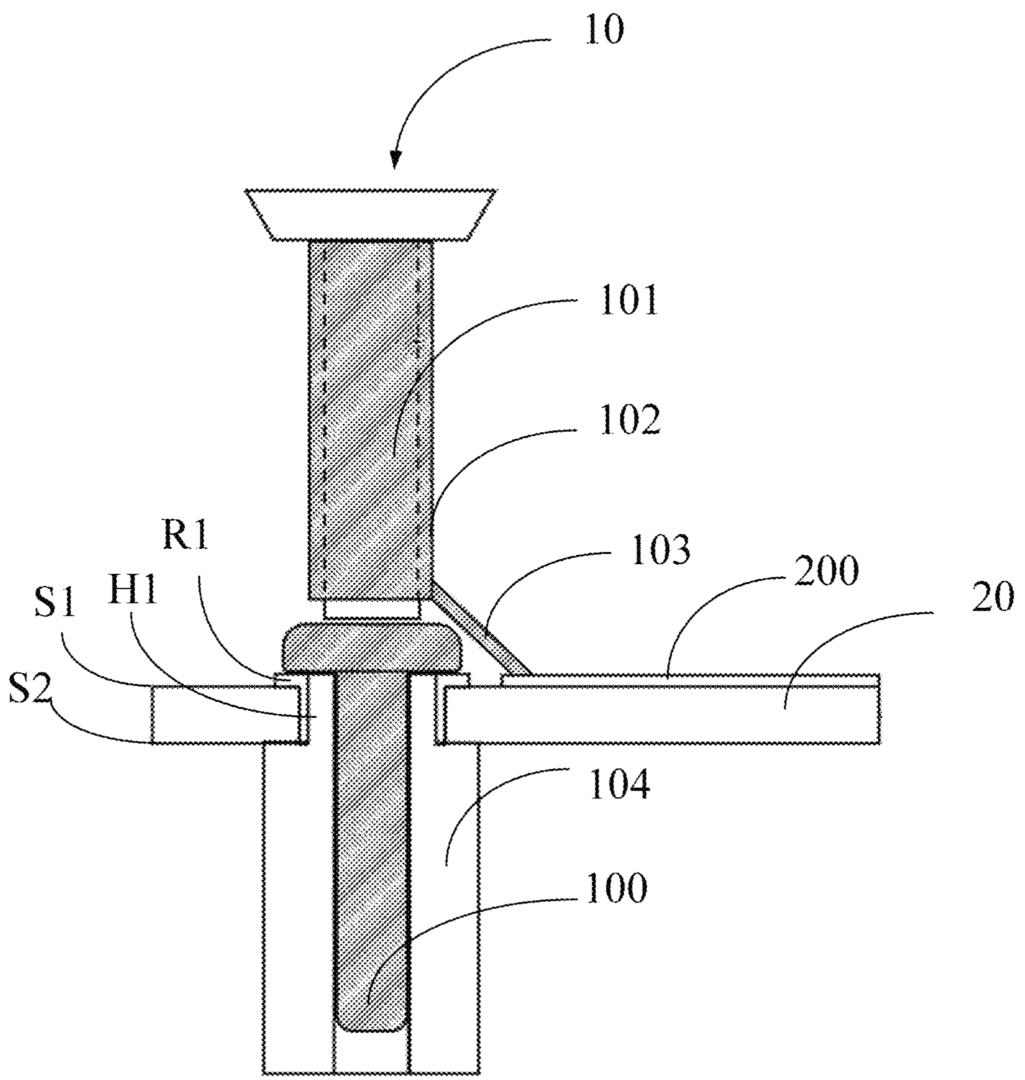
FIG. 1 is a schematic diagram of an antenna structure according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of example and not by way of limitation in the figures of the accompanying drawings, in which like references indicate similar elements. It should be noted that references to “an” or “one” embodiment in this disclosure are not necessarily to the same embodiment, and such references mean “at least one”.

The term “coupled” is defined as connected, whether directly or indirectly through intervening components, and is not necessarily limited to physical connections. The connection can be such that the objects are permanently connected or releasably connected. The term “comprising,” when utilized, means “including, but not necessarily limited to”; it specifically indicates open-ended inclusion or membership in the so-described combination, group, series, and the like.

Referring to FIG. 1, FIG. 1 is a schematic diagram of an antenna structure according to an embodiment of the present disclosure. In the embodiment, the antenna structure 10 is mainly applied in the electronic devices, such as mobile phones, laptops, etc. As shown in FIG. 1, the antenna 10 is arranged on a circuit board 20, and a first surface S1 of the circuit board 20 includes a RF circuit 200. The antenna structure 10 includes a metal screw 100, a plastic column 101, a metal tube 102 and a metal shrapnel 103.

In the embodiment, the metal screw 100 is fixed on the first surface S1 of the circuit 20 through a metal hole H1, and the metal hole H1 forms a metal ring R1 on the first surface S1 of the circuit 20. The metal ring R1 is electrically connected to the metal hole H1. The metal screw 100 is electrically connected to the metal ring R1, specifically, a head of the metal screw 100 directly contacts the metal ring R1. The plastic column 101 is set above the metal screw 100. The metal screw 100 is preferably a copper screw or a copper-plated screw. The metal tube 102 is embedded with the plastic column 101, and the metal tube 102 is not connected to the metal screw 100. That is, the metal tube 102 and the metal screw 100 are spaced apart at a predetermined distance. The first predetermined distance is determined based on actual application requirements and is not limited here. The metal tube 102 is preferably a copper tube or a copper-plated tube. The metal shrapnel 103 extends from a bottom of the metal tube 102. In the embodiment, the metal screw 100 is electrically connected to the RF circuit 200 through the metal ring R1 or the metal tube 102 is electrically connected to the RF circuit 200 through the metal shrapnel 103 to enable the metal screw 100 and the metal tube 102 to transmit and receive signals.

In the embodiment, the antenna structure 10 further includes a plastic screw column 104. The plastic screw column 104 is set on a second surface S2 of the circuit board 20 for embedding and fixing the metal screw 100.

Figure 2:
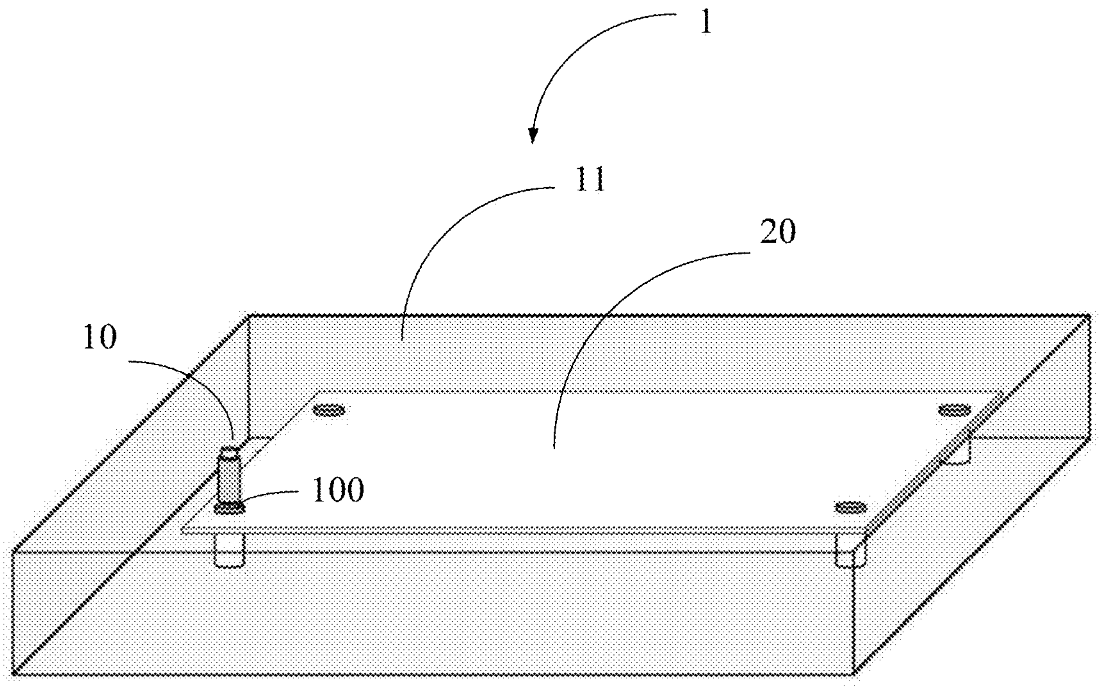
FIG. 2 is a schematic diagram of the antenna structure applied to the electronic device according to an embodiment of the present disclosure.

In the embodiment, the metal screw 100 and the metal tube 102 serve as radiation body structures of a dipole antenna, and when applied to the electronic device, the metal screw 100 can also be used to fix the circuit board 20 to a housing of the electronic device, which improving an internal space utilization rate of the electronic device. Combined with FIG. 2, FIG. 2 is a schematic diagram of the antenna structure applied to the electronic device according to an embodiment of the present disclosure. As shown in FIG. 2, an electronic device 1 includes a housing 11, and the antenna structure 10 is located at a corner edge of the circuit board 20. The metal screw 100 is used as the radiation body of the dipole antenna, while also used to fix the circuit board 20 to the housing 11 of the electronic device 1. It can be understood that FIG. 2 only shows one antenna structure 10 as an example, and in practical applications, the multiple antenna structures 10 can be set on the circuit board 20.

Figure 3:
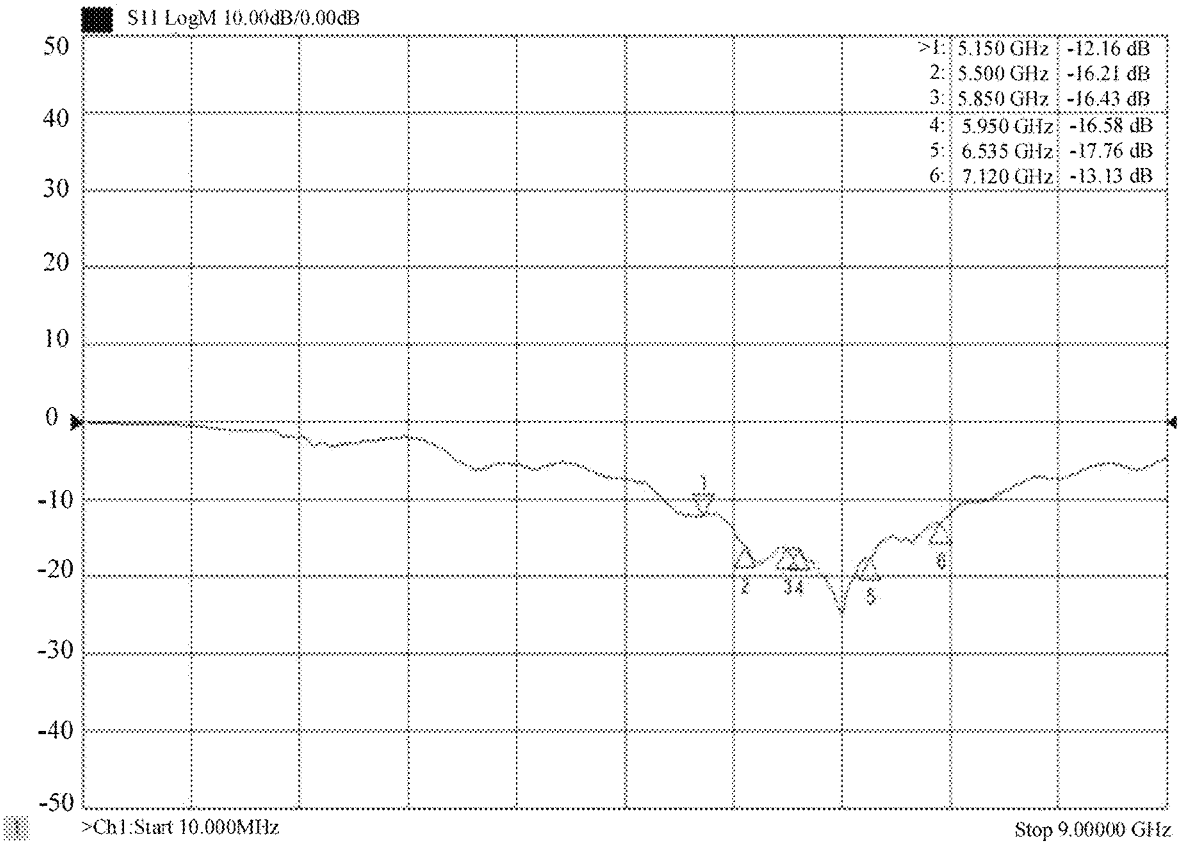
FIG. 3 is a S11 parameter curve of the antenna structure when the metal shrapnel is used as the feed end according to an embodiment of the present disclosure.

In the embodiment, changing a feed end of the antenna structure 10 can adjust an operating frequency range of the antenna structure 10. Specifically, when the metal ring R1 is grounded and the metal shrapnel 103 is electrically connected to the RF circuit 200 as the feed end, that is, the metal screw 100 is grounded as one end of the dipole antenna, the metal tube 102 is electrically connected to the feed end as another end of the dipole antenna, and the antenna structure 10 works in 5G and 6G frequency bands. In the embodiment, a preferred length for the metal screw 100 is 10 mm, a preferred length for the metal tube 102 is 10.5 mm, and a preferred diameter for the metal tube 102 is 4.5 mm. An operating frequency range of the antenna structure 10 covers the 5G and 6G frequency bands. Combined with FIG. 3, FIG. 3 is a S11 parameter curve of the antenna structure when the metal shrapnel is used as the feed end according to an embodiment of the present disclosure. As shown in the FIG. 3, a bandwidth with return loss below-10 dB covers the 5G and 6G frequency bands, and the antenna structure 10 can be used in the 5G and 6G frequency bands.

When the metal ring R1 is electrically connected to the RF circuit 200 as the feed end and the metal shrapnel 103 is grounded, that is, the metal screw 100 is electrically connected to the feed end as one end of the dipole antenna and the metal tube 102 is grounded as another end of the dipole antenna. The antenna structure 10 operates in the 5G or 6G frequency band, and the working frequency band of the antenna structure 100 can be adjusted by adjusting the length of the metal screw 100.

Figure 4:
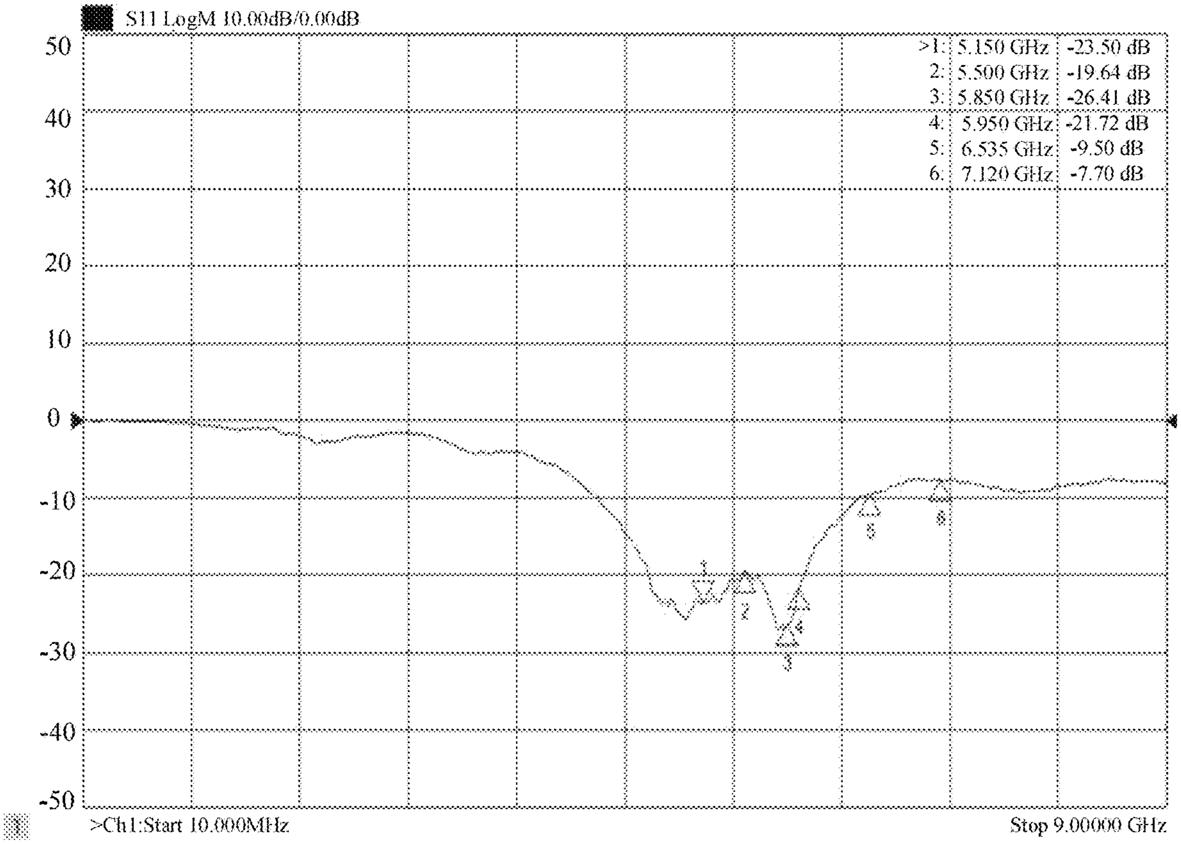
FIG. 4 is a S11 parameter curve of the antenna structure when the metal screw is used as the feed end according to an embodiment of the present disclosure.

Specifically, in the embodiment, a preferred length for the metal screw 100 is 12 mm, a preferred length for the metal tube 102 is 11 mm, and a preferred diameter for the metal tube 102 is 4.5 mm. The operating frequency range of the antenna structure 10 covers the 5G frequency band. Combined with FIG. 4, FIG. 4 is a S11 parameter curve of the antenna structure when the metal screw is used as the feed end according to an embodiment of the present disclosure. As shown in the FIG. 4, the bandwidth with return loss below −10 dB covers the 5G frequency bands, and the antenna structure 10 can be used in the 5G frequency band.

Figure 5:
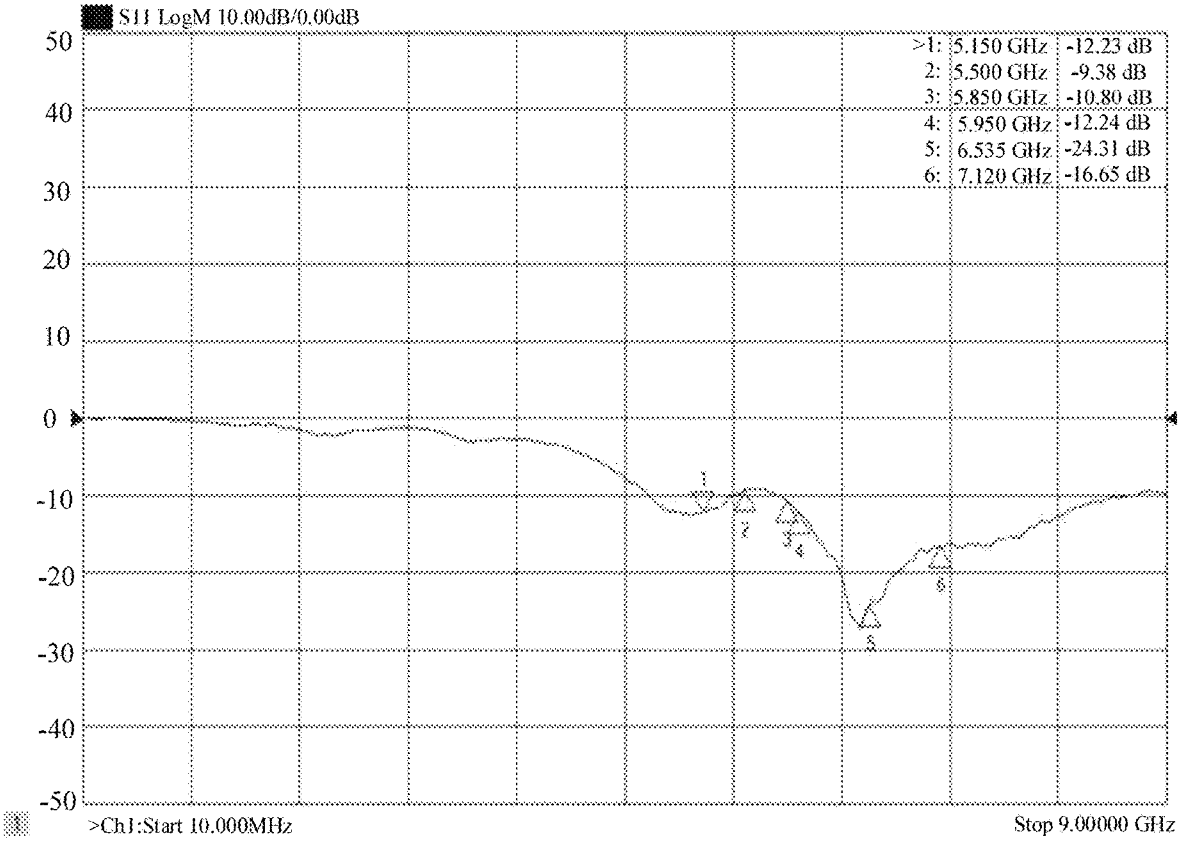
FIG. 5 is a S11 parameter curve of the antenna structure when the metal screw is used as the feed end according to another embodiment of the present disclosure.

Specifically, in another embodiment, a preferred length for the metal screw 100 is 10 mm, a preferred length for the metal tube 102 is 11 mm, and a preferred diameter for the metal tube 102 is 4.5 mm. The operating frequency range of the antenna structure 10 covers the 6G frequency band. Combined with FIG. 5, FIG. 5 is a S11 parameter curve of the antenna structure when the metal screw is used as the feed end according to another embodiment of the present disclosure. As shown in the FIG. 5, the bandwidth with return loss below-10 dB covers the 6G frequency bands, and the antenna structure 10 can be used in the 6G frequency band.

Compared with the prior art, in the antenna structure and electronic device provided by the embodiment of the present disclosure, the metal screw and the metal tube are used as the radiation body structure of the dipole antenna, and the metal screw can also be used to fix the circuit board on the housing of the electronic device, which improving the internal space utilization rate of the electronic device. By changing the feed end of the antenna structure or adjusting the length of the metal screw, the operating frequency range of the antenna structure can be adjusted, so that the antenna structure has better performance and is suitable for mobile communication products.

Many details are often found in the relevant art and many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An antenna structure, comprising: a circuit board, a first surface of the circuit board comprising an RF circuit, and the antenna structure comprising:

a metal screw, fixed on the first surface of the circuit board through a metal hole; wherein the metal hole forms a metal ring on the first surface of the circuit board, and the metal ring is electrically connected to the metal hole;

a plastic column, set above the metal screw;

a metal tube, embedded with the plastic column, wherein the metal tube and the metal screw are spaced apart at a predetermined distance; and a metal shrapnel, extending from a bottom of the metal tube, wherein the metal screw is electrically connected to the RF circuit through the metal ring or the metal tube is electrically connected to the RF circuit through the metal shrapnel to enable the metal screw and the metal tube to transmit or receive signals.

2. The antenna structure according to claim 1, wherein a head of the metal screw directly contacts the metal ring.

3. The antenna structure according to claim 1, further comprising:

a plastic screw column, set on a second surface of the circuit board, the plastic screw column being configured for embedding and fixing the metal screw.

4. The antenna structure according to claim 2, wherein when the metal ring is grounded and the metal shrapnel is electrically connected to the RF circuit as a feed end, the antenna structure operates in 5G and 6G frequency bands.

5. The antenna structure according to claim 2, wherein when the metal ring is electrically connected to the RF circuit as a feed end, and the metal shrapnel is grounded, the antenna structure operates in a 5G or 6G frequency band.

6. The antenna structure according to claim 5, wherein a working frequency band of the antenna structure is adjusted by adjusting a length of the metal screw.

7. The antenna structure according to claim 1, wherein the metal screw is a copper screw or a copper-plated screw.

8. The antenna structure according to claim 1, wherein the metal tube is a copper tube or a copper-plated tube.

9. An electronic device, comprising a housing and an antenna structure, wherein the antenna structure comprises:

a metal screw, fixed on a first surface of a circuit board through a metal hole; wherein the metal hole forms a metal ring on the first surface of the circuit board, and the metal ring is electrically connected to the metal hole;

a plastic column, set above the metal screw;

a metal tube, embedded with the plastic column, wherein the metal tube and the metal screw are spaced apart at a predetermined distance; and a metal shrapnel, extending from a bottom of the metal tube, wherein the metal screw is electrically connected to the RF circuit through the metal ring or the metal tube is electrically connected to the RF circuit through the metal shrapnel to enable the metal screw and the metal tube to transmit or receive signals.

10. The electronic device according to claim 9, wherein the metal screw is further configured to fix the circuit board to the housing.

11. The electronic device according to claim 9, wherein a head of the metal screw directly contacts the metal ring.

12. The electronic device according to claim 9, wherein the antenna structure further comprises:

a plastic screw column, set on a second surface of the circuit board, the plastic screw column being configured for embedding and fixing the metal screw.

13. The electronic device according to claim 11, wherein when the metal ring is grounded and the metal shrapnel is electrically connected to the RF circuit as a feed end, the antenna structure operates in 5G and 6G frequency bands.

14. The electronic device according to claim 11, wherein when the metal ring is electrically connected to the RF circuit as a feed end, and the metal shrapnel is grounded, the antenna structure operates in a 5G or 6G frequency band.

15. The electronic device according to claim 14, wherein a working frequency band of the antenna structure is adjusted by adjusting a length of the metal screw.

16. The electronic device according to claim 9, wherein the metal screw is a copper screw or a copper-plated screw.

17. The electronic device according to claim 9, wherein the metal tube is a copper tube or a copper-plated tube.

* * * * *